United States Patent Office 3,524,914
Patented Aug. 18, 1970

3,524,914
COMPOSITIONS AND METHODS USEFUL IN THE TREATMENT OF SARCOMA 180 IN MICE
Roy L. Whistler, West Lafayette, Ind., assignor to Purdue Research Foundation, Lafayette, Ind., a not-for-profit corporation
No Drawing. Filed Nov. 14, 1967, Ser. No. 682,976
Int. Cl. A61k 27/00
U.S. Cl. 424—180          6 Claims

ABSTRACT OF THE DISCLOSURE

Methods and compositions incorporating the polysaccharide hemicellulose B prepared from wheat straw for the treatment of sarcoma 180 in mice, are described. The conventional preparation of hemicellulose B from wheat straw is also described.

BACKGROUND OF INVENTION

This invention relates to compositions and methods useful in the control of sarcoma 180 in mice. More specifically, this invention is concerned with compositions comprising the polysaccaride hemicellulose B prepared from wheat straw and the method by which the compositions are used to control sarcoma 180 in mice.

Many substances have been discovered to have the ability to control sarcoma 180 in mice. However, those skilled in the art know that most of the substances used heretofore have limited application either because of limited ability to control such tumor growth or because of toxic effects or other side effects which these substances exert. For example, many substances that have been studied as agents for the control of 180 tumors either have only limited ability to control the growth of such tumors or they exert toxic or other side effects on the tumor's mice host.

Japanese Pat. No. 24,791/65 discloses that a naturally occurring polysaccharide with sarcoma 180 tumor-controlling activity can be isolated from bamboo and sasa and plant members of the grass family by a series of steps involving hot water extraction, vacuum concentration of the extract, dialysis of the concentrate, a salting-out step and treatment with a strong acid ion exchange resin, with a strong base ion exchange resin and with a decolorizing resin. These polysaccharides are shown to be very useful in controlling sarcoma 180 in mice, and it would be desirable to improve the results with polysaccharides of this class.

It is therefore an object of the present invention to provide novel methods of treatment and compositions using a polysaccharide prepared from wheat straw which provides improvement in the results with the natural polysaccharides obtained by other methods such as that disclosed in Japanese Pat. No. 24,791/65. These and other objects will become increasingly apparent to those skilled in the art by reference to the following description.

SUMMARY OF INVENTION

According to this invention, novel compositions comprising the polysaccharide hemicellulose B prepared in substantially pure form from wheat straw, and an injectable liquid carrier material, are superior to substances heretofore known in the control of sarcoma tumor growth. Hemicellulose B is provided in substantially pure form from wheat straw by extracting wheat straw with aqueous alkali followed by separation of the hemicellulose B from the extract. Also, according to this invention, sarcoma 180 in mice as a host are controlled by the method which comprises applying hemicellulose B prepared in substantially pure form from wheat straw to the growth.

Those skilled in the art of cellulosic plant material know that various components and mixtures of components can be obtained from cellulosic plant materials depending upon the method used to obtain these components. The hemicellulose B of the present invention is obtained from wheat straw using conventional prior art techniques by aqueous alkali extraction.

Whistler ("Methods in Carbohydrate Chemistry," vol. III, Academic Press (1963) at pp. 21, 22) describes a method for the separation of a material known as holocellulose from annual plants. In this method, the ground plant material in an aqueous slurry is treated with sodium chlorite and glacial acetic acid. The process, referred to hereinafter as oxidative delignification, modifies and solubilizes the lignins in the plant materials, and the cellulosic material known as holocellulose is recovered.

A material known in the art as hemicellulose can be prepared from cellulosic plant materials or from holocellulose. The art also recognizes the existence of two forms of hemicellulose, one known as hemicellulose A and another known as hemicellulose B. A process for the preparation of the hemicelluloses and separation of hemicellulose A from hemicellulose B is described by Whistler ("Methods in Carbohydrate Chemistry," vol. V, Academic Press (1965) at pp. 144, 15). In this method hemicellulose is prepared from plant material or from holocellulose with alkaline solutions. The hemicellulose A is precipitated by neutralization of the alkaline solution and the hemicellulose B is precipitated by the addition of ethanol or another water-miscible organic solvent to the remaining solution.

The exact compositions of hemicellulose, hemicellulose A and hemicellulose B have not been determined. As pointed out by Whistler and Smart ("Polysaccharide Chemistry," Academic Press (1953), at pp. 124, 125) information regarding the properties and constitution of the hemicelluloses is at best fragmentary. Small amounts of these materials are known to be produced in at least small amounts from most cellulosic plant materials when the alkali extraction method is used. The compositions are known to vary slightly from plant to plant of a given species and more widely from species to species. Although in most plant material hemicellulose A is found to be produced in larger amounts than hemicellulose B, the reverse is true in several instances such as in wheat straw used in the present invention wherein the hemicellulose obtained is mostly of the B-type.

DESCRIPTION OF THE INVENTION

The hemicellulose B used in the compositions and methods of the present invention is prepared from wheat straw plant material or from holocellulose obtained from wheat straw plant material. The holocellulose of wheat straw plant material can be obtained by removing lipids (defatting) and lignins (delignifying) from wheat straw by procedures known in the art.

Several defatting procedures are described by Whistler and Smart ("Polysaccharide Chemistry," Academic Press (1953), pp. 113–120). One of the most commonly used methods for defatting cellulosic plant materials is extraction of the plant materal with a mixture of a hydrophobic organic solvent and a hydrophilic organic solvent. Wheat straw can be defatted by extraction with a hot azeotropic mixture of benzene and ethanol.

Several methods for removal of lignins are also described by Whistler and Smart. As for example, lignins can be removed by extraction of the plant material with a boiling solution of 50 percent ethanol containing about 1 percent sodium hydroxide or with ethanol containing about 0.1 percent sodium hydroxide or various concentrations of ammonia. Other procedures for removal of lignins involve chlorination followed by extraction, sometimes with ethanolamine or an alcoholic solution of ethanolamine.

Another commonly used procedure for removal of lignins, which has been found to be useful in the removal of lignins from wheat straw in the preparation of the compositions of this invention is the chlorous acid oxidative delignification procedure reported by Whistler and described hereinbefore. This procedure is particularly preferred because of the superior results with the hemicellulose B obtained.

By way of specific example, the hemicellulose B from wheat straw, which is used in this invention, was prepared as follows: Approximately 200 grams of finely ground wheat straw plant material and four liters of deoxygenated (to prevent alkaline oxidation) 10 percent by weight sodium hydroxide solution were placed in a 3-neck, 5-liter flask equipped with a mechanical stirrer. Wheat straw plant material which had been defatted by extraction with hot benzene-ethanol mixture and delignified by the chlorous acid acid oxidative delignification procedure was used in the same manner. An oxygen-free atmosphere was maintained in the flask by passing a slow stream of nitrogen through the flask by way of the two remaining necks. The reaction was continued with stirring at 25° C. for 18–24 hours. The alkaline slurry was then vacuum filtered through cloth on a Buchner funnel to obtain a mixture of hemicelluloses A and B in the filtrate.

The filtrate was cooled in an ice bath and acidified to pH of about 5 with 50 percent aqueous acetic acid. The resulting precipitate, hemicellulose A, was removed by centrifugation. The clear solution was diluted with about three times its volume of 95 percent ethanol. (Dilution can also be done with other water-miscible organic solvents, such as acetone, in which the product is insoluble.) After precipitation was complete, the mixture was centrifuged at low speed, about 500 r.p.m., and the supernatant liquid was discarded.

The precipitated product was redissolved in water, again centrifuged at low speed and any undisolved materials were discarded. The supernatant liquid was concentrated by vacuum distillation at low temperature and finally dried by lyophylization. This product, referred to hereinafter as crude hemicellulose B, was used to prepare the compositions of this invention and in the methods of this invention.

The product was further purified by dissolving the product in a minimum quantity of water, acidifying the solution to pH of 2.5 with sulfuric acid, and adding about two times the solution's volume of 95 percent ethanol. The mixture was centrifuged at low speed and the supernatant liquid was diluted with about three times its volume of 95 percent ethanol. The precipitated product was filtered, washed with actone and dried under vacuum. This product, referred to hereinafter as reprecipitated hemicellulose B, was also used in the preparation of the compositions of this invention and in the methods of this invention.

For comparative test purposes, hemicellulose B was prepared in like manner from soy bean, sunflower stalk and slash pine. The results of such testing are shown hereinafter.

In general, the alkaline solutions of the present invention used to extract the hemicelluloses A and B are aqueous solutions of alkali metal hydroxides, particularly potassium hydroxide and sodium hydroxide. The concentrations used were in the range of about one percent (1%) to twenty percent (20%) by weight in the aqueous solutions. For maximum yield, it is preferred that the extraction be conducted for 18–25 hours at ambient temperatures.

The hemicellulose A can be precipitated by adding to the alkaline solution a sufficient quantity of any fairly strong acid to adjust the pH of the solution to the range of about 2.5–6. This step is also conducted at ambient temperatures. It is believed that the hemicellulose B is acidic in character, being comprised principally of linked xylose, arabinose, and glucuronic acid units, and as a result the alkali metal hydroxide reacts with hemicellulose B to form an alkali metal salt of hemicellulose B. The hemicellulose A is also soluble in the alkaline solution. Upon neutralization of the alkaline solution with the acid, the hemicellulose A precipitates while the hemicellulose B remains dissolved as the acid form of hemicellulose B. Hemicellulose A, being composed primarily of linked xylose units is believed to be substantially free of acidic groups.

The crude hemicelluolse B obtained from the prior procedure can be purified by various conventional techniques including reprecipitation as described above and dialysis at ambient temperatures. In the preceding example, the principal impurity is the alkali metal salt of the acid used, sodium acetate, which can easily be removed by dialysis or other known techniques for removing small molecules (sodium acetate) from large molecules (hemicellulose B). Numerous variations will be obvious to those skilled in the art.

The compositions of this invention were prepared by dissolving the wheat straw hemicellulose B preparations, prepared as described hereinbefore, in a liquid carrier material suitable for injection into the mice host with a sarcoma 180 tumor growth. Suitable liquids include water, glycerine, and salt solutions. Those skilled in the art will recognize that the liquid is an inert liquid carrier and that other liquids can be used which will dissolve the hemicellulose B preparation and which are suitable for injection.

The concentration of the wheat straw hemicellulose B preparation in the liquid carrier material can vary from 0.25 to 10.0 percent by weight. Amounts injected into mice can vary from about 10 to 200 milligrams of active material per kilogram host weight. The compositions need not be injected directly into the tumor, the tests having been conducted by intraperitoneal injection.

The effects of the compositions were determined with mice with implanted sarcoma 180 and ehrlich carcinoma. Seven days old sarcoma 180 ascites cells or ehrlich carcinoma ascites cells were injected subcutaneously in 0.05 ml. doses into the right groin of normal Swiss albino strain mice (designated by the National Institute for Genetics, Mishima, Japan) weighing about 20 grams. This produced solid tumors at the site of injection. Spontaneous mammary adenocarcinomas were those in Swiss albino mice. Tumors of suitable size were surgically removed as completely as possible, and a small piece was returned to the site of the operation as an autologous graft in order to imitate incomplete removal and insure local recurrence. Crude hemicellulose B prepared from various sources was dissolved in sterile distilled water as inert liquid carrier material. Treated mice received intraperitoneal injections of the compositions daily in 200 mg./kg. doses for ten days, beginning twenty-four hours after implantation of sarcoma 180. The rates of growth of the tumors in the treated mice and the control mice were charted weekly for five weeks, or as long as the mouse lived in the case of spontaneous tumors. After five weeks, the tumors of the surviving mice were removed and weighed.

The sarcoma 180 tumor-inhibiting effect of the compositions comprising hemicellulose B prepared from wheat straw was striking in that complete regression occurred in nine out of ten of the treated mice, as shown in Table I. Among the few remaining tumors, most were necrotized. The treated mice maintained excellent physical condition throughout the period of injections with no evidence of any toxic effect.

TABLE I.—EFFECT OF CRUDE SAMPLES OF HEMICELLULOSE B ON SARCOMA 180

| Source | No. of mice | Complete regression | Tumor weight, average (min.-max.) | Inhibition rate, percent |
|---|---|---|---|---|
| Soy bean | 9 | 1/9 | 2.0 (0-6.7) | 42.9 |
| Control | 10 | 0/10 | 3.5 (0.6-6.6) | |
| Sunflower stalk | 9 | 0/9 | 5.6 (2.0-11.3) | 29.2 |
| Control | 10 | 0/10 | 7.9 (5.1-10.9) | |
| Slash pine | 10 | 0/10 | 6.8 (2.1-14.1) | -9.6 |
| Control | 10 | 0/10 | 6.2 (2.9-9.7) | |
| Wheat staw | 10 | 9/10 | 0.17 (0-1.7) | 96.6 |
| Control | 10 | 0/10 | 5.6 (0.2-11.2) | |

Further tests were conducted using compositions containing reprecipitated hemicellulose B prepared from wheat straw. These tests were also carried out on mice having implanted sarcoma 180, but at dosage levels of 50 and 100 mg./kg. as well as 200 mg./kg. The results are given in Table II. Table II also includes for comparison the results of the treatment of one group of mice with 200 mg./kg. doses of water solutions of hemicellulose A prepared from wheat straw. The results show the outstanding effect of the compositions of this invention and the complete ineffectiveness of the hemicellulose A preparation.

TABLE II. — EFFECT OF PRECIPITATED WHEAT STRAW HEMICELLULOSE B (AND OF HEMICELLULOSE A FOR COMPARISON) ON SARCOMA 180

| Dose X No. Days | No. of mice | Complete Regression | Tumor Weight Average (min.-max.) | Inhibition Rate percent |
|---|---|---|---|---|
| 200 mg./kg. X 8 | 7 | 1/7 | 3.6 (0 -12.0) | 65.7 |
| Control | 8 | 0/8 | 10.5 (8.1-13.0) | |
| 100 mg./kg. X 10 | 10 | 6/10 | 0.69 (0 -2.3) | 89.7 |
| Control | 10 | 0/10 | 6.6 (3.9-9.5) | |
| 100 mg./kg. X 10 | 10 | 8/10 | 0.04 (0 -0.2) | 99.5 |
| Control | 10 | 0/10 | 7.2 (2.7-11.5) | |
| 50 mg./kg. X 10 | 10 | 4/10 | 1.1 (0 -3.4) | 88.3 |
| Control | 9 | 0/9 | 9.4 (7.2-13.3) | |
| Hemicellulose A: | | | | |
| 200 mg./kg. X 10 | 8 | 0/8 | 9.9 (6.6-14.1) | 5.8 |
| Control | 8 | 0/8 | 10.5 (8.1-13.0) | |

Compositions containing reprecipitated hemicellulose B prepared from wheat straw were tested in a similar manner on mice which had received subcutaneous implants of ehrlich carcinoma. The results, Table III, show the absence of complete regression and that generally the compositions were poorly effective in the control of ehrlich carcinoma.

TABLE III. — EFFECT OF REPRECIPITATED WHEAT STRAW HEMICELLULOSE B ON EHRLICH CARCINOMA (SOLID FORM)

| Dose X No. Days | No. of mice | Complete Regression | Tumor Weight Average (min.-max.) | Inhibition Rate percent |
|---|---|---|---|---|
| 200 mg./kg. X 2 | 10 | 0/10 | 4.0 (1.4-6.4) | -21.1 |
| Control | 10 | 0/10 | 3.3 (1.1-5.8) | |
| 200 mg./kg. X 5 | 9 | 0/9 | 2.0 (0.9-4.0) | 48.8 |
| Control | 10 | 0/10 | 3.9 (1.5-6.3) | |
| 200 mg./kg. X 10 | 10 | 0/10 | 1.9 (0.8-2.7) | 66.1 |
| Control | 10 | 0/10 | 5.6 (0.6-9.5) | |
| 200 mg./kg. X 20 | 9 | 1/9 | 2.1 (o -5.4) | 30.0 |
| Control | 10 | 0/10 | 3.0 (0.7-5.6) | |

Similarly it was found that the compositions were uneffective on autologous grafts of spontaneous mammary adenocarcinoma.

An outstanding observation in all of the tests was that the toxicity of the compositions was very low, especially as compared with the toxicity of other substances which have been studied for the same purpose. No toxic effects were observed even when the highest dosages were used. The hemicellulose B can be applied directly into the sarcoma 180 tumor or intraperitoneally by injection with good results. Further, bacteriostatic tests have shown that the compositions have marked anti-bacterial action.

With the above description, those skilled in the art will readily appreciate the value of this invention and will recognize various modifications which may be employed in practicing the invention. Therefore, the scope of the invention is limited only by the following claims, rather than by the specific examples and description.

I claim:
1. A composition useful in the treatment of sarcoma 180 which comprises: an effective anti-sarcoma 180 amount of
   (a) wheat straw hemicellulose B prepared by the process which includes the steps of dissolving the hemicelluloses A and B of wheat straw cellulosic material with an aqueous solution of an alkali metal hydroxide in a concentration in the range of about one percent to twenty percent by weight, acidifying the solution containing hemicelluloses A and B to a pH between about 2.5-6 to neutralize the alkali metal hydroxide and precipitate hemicellulose A and separating the dissolved hemicellulose B from the solution; and
   (b) a sterile, injectable liquid carrier material, the composition being in dosage unit form.
2. The composition of claim 1 wherein the wheat straw hemicellulose B is present in an amount between about one quarter of one percent and ten percent by weight in the liquid carrier material.
3. The composition of claim 1 wherein the sterile injectable liquid carrier material is water.
4. A method for the control of sarcoma 180 in mice which comprises: administering to said mice by injecting an effective anti-sarcoma 180 amount of the composition of claim 1.
5. The method of claim 4 wherein between about ten and two hundred milligrams of the wheat straw hemicellulose B is injected per kilogram of body weight of the mice.
6. The method as set for in claim 4 wherein the injections are made intraperitoneally into the mice.

References Cited

Chemical Abstracts (I), 51:4703d-4704d (1957).
Chemical Abstracts (II), 62:6867c (1965).
Derwent Farmdoc #19,028, abstracting Japan Patent 24,791/65, published Oct. 29, 1965.

ALBERT T. MEYERS, Primary Examiner

J. D. GOLDBERG, Assistant Examiner